(12) United States Patent
Maleus

(10) Patent No.: US 8,901,884 B2
(45) Date of Patent: Dec. 2, 2014

(54) COMBINED BATTERY CHARGER AND BATTERY EQUALIZER

(75) Inventor: Börje Maleus, Bro (SE)

(73) Assignee: CTEK Sweden AB, Vikmanshyttan (SE)

( * ) Notice: Subject to any disclaimer, the term of this patent is extended or adjusted under 35 U.S.C. 154(b) by 940 days.

(21) Appl. No.: 12/780,968

(22) Filed: May 17, 2010

(65) Prior Publication Data

US 2011/0227537 A1    Sep. 22, 2011

(30) Foreign Application Priority Data

Mar. 16, 2010    (EP) .................................... 10156636

(51) Int. Cl.
*H02J 7/04* (2006.01)
*H02J 7/00* (2006.01)
*H02J 7/14* (2006.01)
*H02J 7/34* (2006.01)

(52) U.S. Cl.
CPC ............. *H02J 7/0014* (2013.01); *H02J 7/0018* (2013.01); *H02J 7/34* (2013.01); *H02J 7/0016* (2013.01); *H02J 7/1423* (2013.01)
USPC ........... 320/116; 320/119; 320/137; 320/128; 320/132

(58) Field of Classification Search
USPC ......... 320/116, 137, 119, 123, 128, 164, 138, 320/140, 122, 121, 118, 162, 124, 127, 166, 320/132; 307/82, 10.1, 9.1, 66
See application file for complete search history.

(56) References Cited

U.S. PATENT DOCUMENTS

| 4,479,083 | A | 10/1984 | Sullivan |
| 4,684,814 | A | 8/1987 | Radomski |
| 4,967,136 | A | 10/1990 | Nofzinger |
| 7,180,205 | B2 | 2/2007 | Wirdel |
| 7,282,814 | B2 * | 10/2007 | Jacobs ............................ 307/82 |
| 2003/0062773 | A1 | 4/2003 | Richter et al. |
| 2006/0261779 | A1 | 11/2006 | Maleus |

* cited by examiner

*Primary Examiner* — Edward Tso
*Assistant Examiner* — Alexis A Boateng
(74) *Attorney, Agent, or Firm* — Young & Thompson

(57) ABSTRACT

A combined battery charger and battery equalizer for equalizing a first battery bank and charging a second battery bank, respectively includes a buck-boost power converting circuit configured to convert a received electrical voltage into, either a battery equalization voltage, or a battery charging voltage. The buck-boost power converting circuit is connected to an output switch configured to enable output of either the equalization voltage level to a battery equalizer output connector, or the battery charging voltage to a battery charging output connector. A combined battery charging and battery equalization system includes a voltage source connected to a combined battery equalizer and battery charger configured to convert an electrical voltage received from the voltage source into either a battery equalization voltage or a battery charging voltage, and connected to either a positive pole of a starter battery bank or to a voltage reference point of a service battery bank.

31 Claims, 3 Drawing Sheets

FIGURE 1 – PRIOR ART

COMBINED BATTERY CHARGER AND BATTERY EQUALIZER

TECHNICAL FIELD

The present invention relates to a device, a system and a method thereof, for combined battery equalization and battery charging. In particular the present invention relates to a device, a system and a method having a combined battery equalizer and battery charger for providing either a battery equalization voltage or a battery charging voltage.

BACKGROUND

Charging of a battery is accomplished by a supply of a direct current (DC) current to the battery. The DC current provides electrical charges that are stored in the battery through an electro-chemical process. Since electrical current is defined as 'the transport of electrical charges per time', energy delivered during the charging process is determined by the amount of DC current supplied and elapsed time. Electrical energy is normally transferred from a generator and converted into DC quantities, in a controllable manner, suited to the voltage/current levels of the battery. Bearing this in mind and also realizing that lead-acid technology being the oldest, and to this date, the most cost efficient form of battery technology for the majority of today's conventional vehicles, will take the reader to an insight that charging of lead-acid batteries is an important technical area to improve. What also could be noted is that the lead-acid battery is effective in applications that require a high-rate 'pulse-like' discharge, such as in engine starting.

Most vehicle and naval applications for batteries require higher voltage than can be obtained from a single electro-chemical cell. For example, a 12V lead-acid battery is composed of six individual cells coupled in series. In larger vehicles and naval vessels it is normal to have a battery bank, comprising of several batteries in series to obtain a sufficient voltage level. In general, cars (such as a bus and a truck) and various naval vessels have a power system operating at 24V, thus it is customary in the above mentioned applications to have a large multipurpose battery bank. The battery bank normally includes two or more conventional, high performance, lead-acid batteries coupled in series. Typically the 24V battery bank mentioned above consists of two 12V batteries which are connected in series to each other and to which a generator is coupled. By this can be realized that batteries are 'nearly always' used in series combinations of multiple cells and batteries put in series are often treated as one big battery.

When a series string of cells is charged as a group, a single current is normally imposed on all the cells and the voltage across each battery is assumed to be equal, during both charging and discharging. However, batteries that are charged in series often exhibit effects such as some batteries being undercharged and some batteries being overcharged and if the voltages begin to differ, the result is a charge imbalance which ultimately may lead to battery failure. Undercharging of lead-acid batteries can cause permanent damage to the battery. This occurs when batteries are discharged in series and the batteries that were undercharged will become fully discharged before the others, causing sulphating. The 'good' batteries will then start to charge the 'bad' ones in reverse, (polarity reversal). Overcharging may lead to the loss of water and potential thermal runaway because the voltage is not evenly spread among the batteries. The reason is due to the fact that the properties of the different batteries are not identical. Thus, a battery bank is only as good as its weakest cell.

Therefore dedicated devices have been developed with the ability to control the charging and preferably also the discharging of individual battery cells, or batteries in a battery bank. This means that all the batteries can be kept in a similar state of charge and no extra stress would be placed on a weak battery or a weak cell. Thus in any useful series battery charging process, some type of battery charge balancing or battery equalization takes place to restore the balance between batteries, or at least prevent imbalance from growing. The need for and use of battery equalization is especially important when the batteries are deeply discharged, which is caused by the batteries being in constant use; i.e. experiencing a continuous power outtake. Battery equalization is, since many years, an established technique. In most known battery charging practice, battery equalization is addressed by driving the charge to a sufficient potential, to assure some degree of overcharge for all cells.

The purpose of using a multipurpose battery bank, such as described above, is to provide a higher voltage than can be provided by a single battery. The multipurpose battery bank described above is normally located at 'a distance' from the load. For instance, the multipurpose battery bank in a conventional bus is located in the front of the vehicle, due to weight distribution issues and is used both as a service battery for lightning and other services needed, as well as being used as a starter battery by the starter motor. Thus different types of loads are connected to the multipurpose battery bank.

There are several problems with this approach, namely the need for long and expensive cables. A bus or a truck for instance may be up to 24 meters long and would require a 10-20 meters long cable with a cross-sectional area of at least 95 mm$^2$. The hefty cross-sectional cable area of 95 mm$^2$ is needed because the cable has to withstand stress caused when actuating a heavy load such as a starter motor, e.g. the cable has to withstand a large current flow. An electric load such as a starter motor in a bus will require approximately 1000-1100 Amperes during a couple of seconds, thus is needed a cable with a large cross-sectional area to cope with the high current peak.

Furthermore, the length of the cable is causing at least one problem, namely a rather severe voltage drop. This voltage drop occurs when a high current is drawn trough the cable, i.e. when the starter motor is actuated. This high current will cause a voltage drop of some 5 to 8 volts due to the internal resistance of the cable. Actually the voltage drop is comparable to approx. 30% of the available voltage of typically 24-28V. The voltage drop also has implications on components of the vehicle. The starter motor will, due to the voltage drop over the cable, suffer from an under-voltage causing an over-current compensating for the under-voltage. Thus, the starter motor will be over-loaded and in probably face a shorter life span than could be expected without the extra stress caused.

Also notable, since a multipurpose battery bank, as described above, will have to be designed for its largest load situation it will become rather large. Typically in a bus, the multipurpose battery bank will consist of two serially connected 12V/225 Ah batteries with a total weight of 130 kg. A further disadvantage of prior art solutions, using multipurpose battery banks, is that a continuous power outtake from the multipurpose battery bank by service loads will cause deep discharge. Whereas intermittent power outtakes from the multipurpose battery bank by starter motors will require the multipurpose battery bank to have very large instant capacity. Both these requirements are hard to meet with the multipurpose battery bank, thus the multipurpose battery bank has to be designed both for continuous loads as well as for intermittent high loads.

Thus, as can be noted by the above, there are several severe and costly problems with charging of batteries in large vehicles and naval applications. There is therefore a need for an arrangement and system for improved battery charging and battery equalization to assure maximum lifetime of a battery bank and at the same time assuring proper and stable functionality of the battery bank.

SUMMARY

An object of the embodiments of the present invention is to provide an arrangement and a system that alleviates at least some of the problems mentioned above. The above stated object is achieved by means of a combined battery charger and battery equalizer and an improved battery charging system.

Thus, a first exemplary embodiment of the present invention provides a combined battery charger and battery equalizer for equalizing a first battery bank and charging a second battery bank, respectively, including a buck-boost power converting circuit which is configured to convert a received electrical voltage into either a battery equalization voltage, or a battery charging voltage. The buck-boost power converting circuit is connected to an output switch which is configured to enable output of either the equalization voltage level to a battery equalizer output connector, or the battery charging voltage to a battery charging output connector.

A second exemplary embodiment of the present invention provides a combined battery charging and battery equalization system wherein a voltage source is connected to a combined battery equalizer and battery charger. The combined battery equalizer and battery charger is configured to convert an electrical voltage received from the voltage source into either a battery equalization voltage or a battery charging voltage. The combined battery equalizer and battery charger is further connected to either a positive pole of a starter battery bank for enabling controlled battery charging of the starter battery bank or it is connected to a voltage reference point of a service battery bank for enabling controlled battery equalization of the service battery bank.

A third exemplary embodiment of the present invention provides a method for combined battery charging and battery equalization in a combined battery charger and battery equalizer comprising receiving a voltage from a voltage source. Followed by converting the received voltage into either a battery equalization voltage or a battery charging voltage and finally followed by controlling an output switch to output either the battery equalization voltage or the battery charging voltage to either a battery equalizer output connector or to a battery charging output connector.

An advantage of some embodiments of the invention is the enablement of an effective combined battery equalization and battery charging, without utilization of separate devices for achieving combined battery equalization and battery charging. A further advantage of some embodiments of the invention is enablement of service voltage output at very low additional cost, since separate power converters for service voltage is superfluous. Yet a further advantage of some embodiments of the invention is extended battery life time, due to battery equalization. Yet a further advantage of some embodiments of the invention is reduced voltage drop due to lengthy cables. Yet a further advantage of some embodiments of the invention is extended life time for devices previously suffering from voltage drops.

BRIEF DESCRIPTION OF THE DRAWINGS

In the following description of embodiments of the invention, reference will be made to the accompanying drawings of which.

DETAILED DESCRIPTION

Figure 1:
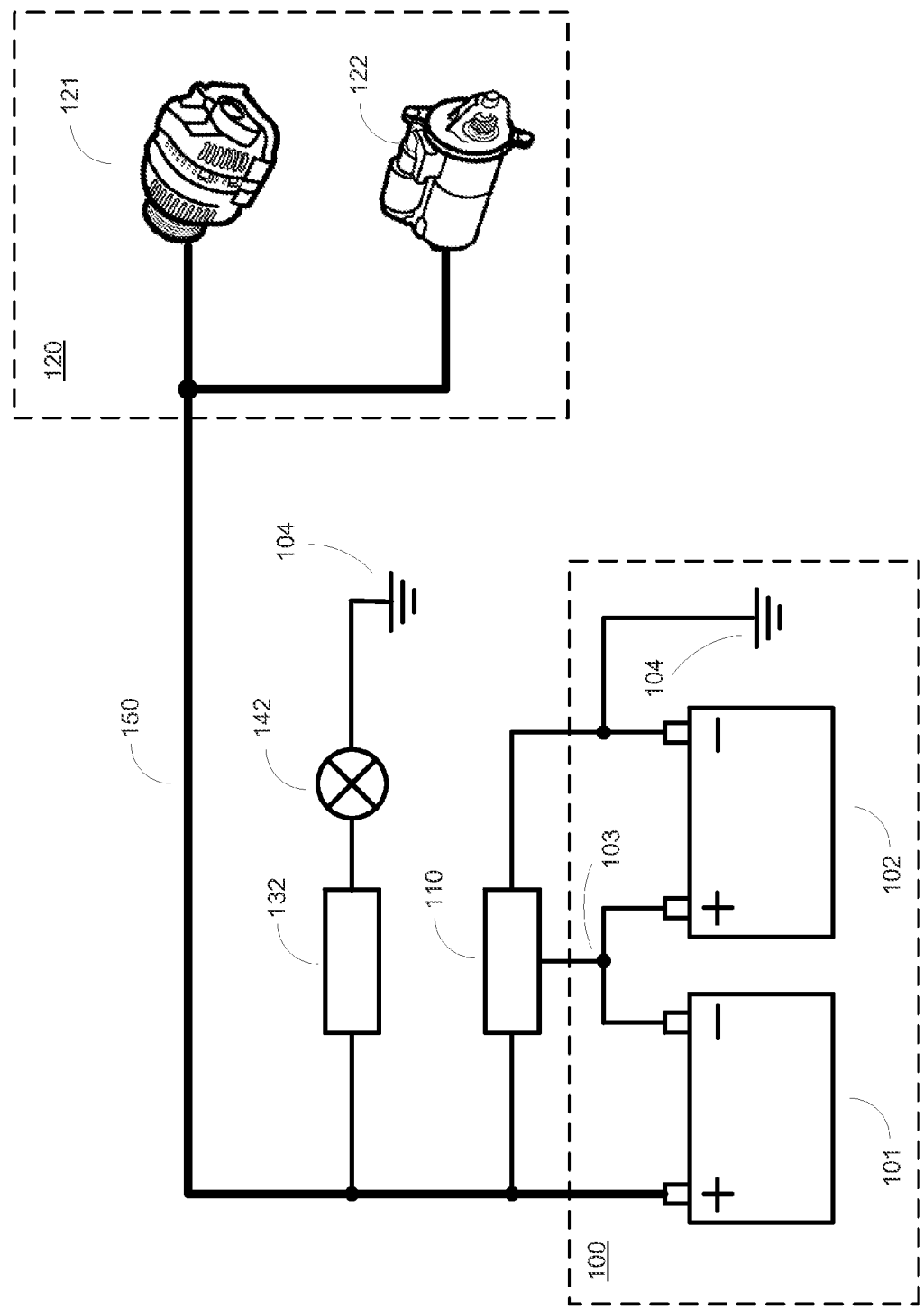
FIG. 1 is a schematic diagram of a prior art battery charging system.

FIG. 1 is a diagram illustrating a prior art battery charging system including a multipurpose battery bank 100. The multipurpose battery bank 100 provides a higher voltage than can be provided by a single battery and is used by all types of electrical loads 122, 132 connected to the multipurpose battery bank 100.

The described multipurpose battery bank 100 includes a first battery 101 and a second battery 102, serially connected to each other via a reference potential point 103. The battery charging system further includes a battery equalizer device 110, a voltage converter 132, and a cable 150. The cable 150 is supplying electrical power from a voltage source 121 residing in a remote motor cabinet 120. Said remote motor cabinet 120 further includes an electrical load 122. The electrical load 122 is typically a starter motor. The voltage source 121 produces electrical power, having a voltage of approximately 28.3 V. The voltage is distributed via the cable 150 and lead to a positive pole of the first battery 101 of the multipurpose battery bank 100. The voltage is also lead to an input of the voltage converter 132, to an input of the battery equalizer device 110 and to the positive pole of the first battery 101 of the multipurpose battery bank 100.

The voltage converter 132 is connected between the voltage source 121 and an electrical load 142. The voltage received at the input of the voltage converter 132 is transformed, by the voltage converter 132, to a voltage level different than the received voltage level and delivered at an output of the voltage converter 132. Typically the voltage level is transformed from 28.3V to 12V. The 12V voltage output from the voltage converter 132 is supplied to the electrical load 142 operating at 12V voltage level. Typical electrical loads 142 are electronic circuits and system, such as lighting and ventilation.

The input of the battery equalizer device 110 is, as described above, connected to the voltage source 121 and a second input of the battery equalizer device 110 is connected to an earthed potential 104 of the negative pole of the second battery 102. The earthed potential 104 acts as common ground potential for the complete battery charging system. An output of the battery equalizer device 110 is connected to the reference voltage point 103 of the multipurpose battery bank 100. The voltage received at the first input of the battery equalizer device 110 is converted, by the battery equalizer device 110, to a battery equalization voltage having a different voltage level than the received voltage. The battery equalization voltage is the difference in potential between the received voltage at the first input of the battery equalizer device 110 and the potential of the second input of the battery equalizer device divided by two. Thus the voltage, typically 28.3V, received at the first input is subtracted by zero volts, received at the earthed second input, and divided by two; which equals 14.15V.

The battery equalization voltage is output by battery equalizer device 110 to the reference voltage point 103. Thus the voltage from the voltage source 121, received at the positive pole of the first battery 101, charges the first battery 101 and the battery equalization voltage, output at the reference voltage point 103, equalizes the charging of the second battery 102. Thereby batteries 101 and 102 are charged by an equal potential, i.e. 14.15V over each battery 101 and 102, and both batteries 101 and 102 may be kept in a similar state of charge.

A problem arises when actuating the electrical load 122. The electrical load 122 is normally a starter motor requiring some 1000 Amperes or more. The current of 1000 Amperes or more will run through the cable 150. Typically a 20 meter long cable 150, with a cross-sectional area of 95 mm$^2$, would be used in an application as described above. The cable 150 has a non-negligible inner resistance, which causes a voltage drop of approximately 8-10V. This, in turn, causes unnecessary stress to the electrical load 122, i.e. starter motor. This is disadvantageous and requires improvements, thus now turning to embodiments of present invention.

Figure 2:
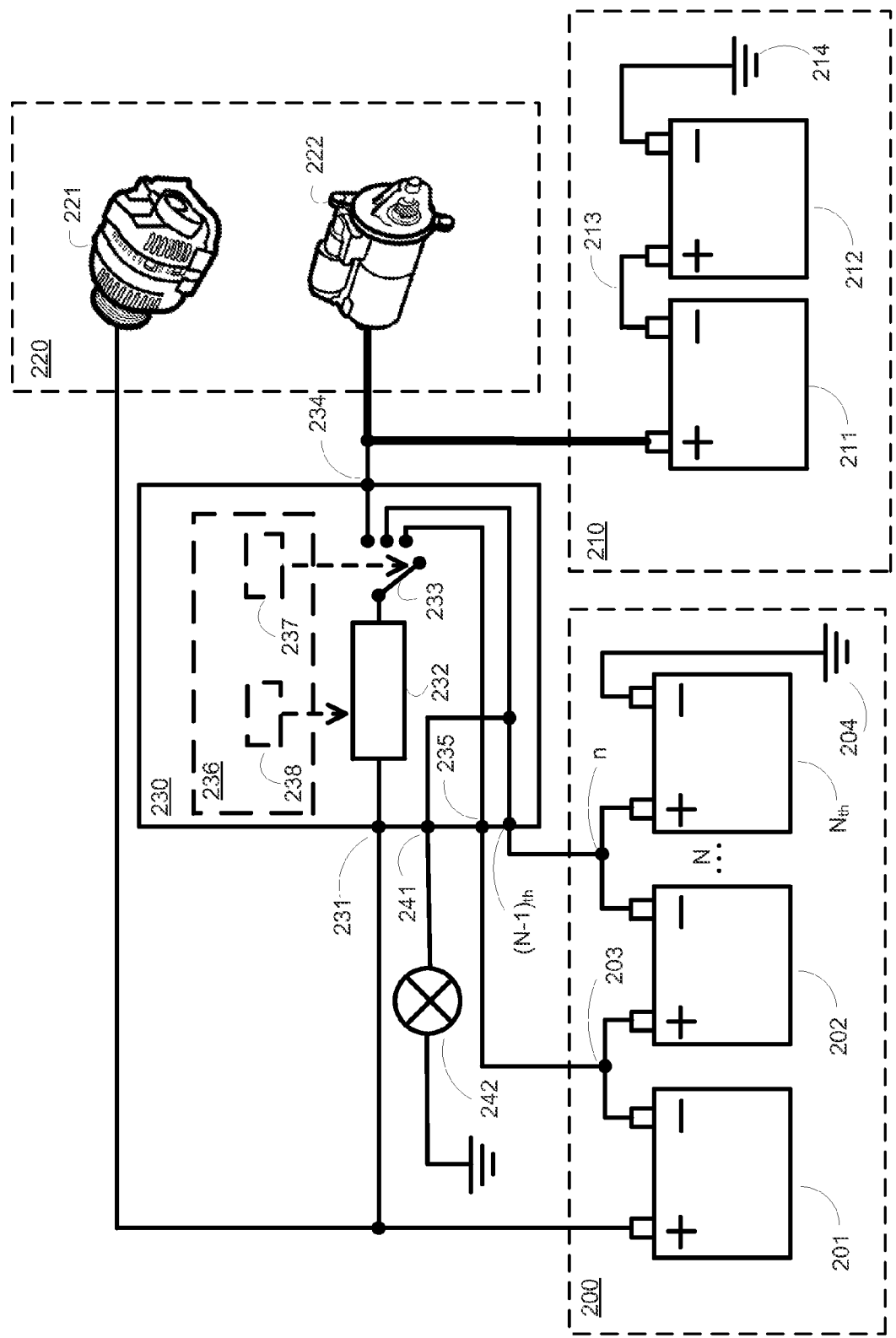
FIG. 2 is a schematic diagram of an embodiment according to the invention.

FIG. 2 is a diagram illustrating a battery charging and battery equalization system comprising a combined battery equalizer and battery charger 230 according to an embodiment of the present invention. The combined battery equalizer and battery charger 230 includes an input connector 231, a buck-boost power converting circuit 232, a battery charging output switch 233 connected to a battery charging output connector 234 and a battery equalizer output connector 235. The system shown further includes a remote motor cabinet 220 including a voltage source 221 and a load 222. The combined battery equalizer and battery charger 230 also includes a processing logic circuit 236. The processing logic circuit 236 further includes a switch control circuit 237 and a control circuit 238. In an exemplary embodiment of the invention the voltage source is a generator or alternator 221 and the load is a starter motor 222.

Also included in the a battery charging and battery equalization system is a service battery bank 200 comprising a first service battery 201 a second, serially connected service battery 202 up to N serially connected service batteries $N_{th}$. The voltage source 221 is connected to a positive pole of the first service battery 201 and a negative pole of the first service battery 201 is connected to a positive pole of the second service battery 202, via a connection having a reference potential point 203. The sequence of serially connected service batteries having a reference potential point (also not illustrated) between each battery expands until the $N_{th}$ battery $N_{th}$. A negative pole of the $N_{th}$ service battery $N_{th}$ is connected to a grounded/earthed potential 204. There are more battery equalizer output connectors 235, $(N-1)_{th}$ than one, depending on the number of batteries in the service battery bank 200 to be charged. In the described embodiment of the invention there are N−1 battery equalizer output connectors 235, $(N-1)_{th}$ where N is the number of serially connected batteries in the service battery bank 200 to be charged. Only the first 235 and the last $(N-1)_{th}$ battery equalizer output connector $(N-1)_{th}$ is illustrated. The connectors between battery equalizer output connector 235 and battery equalizer output connector $(N-1)_{th}$ are for illustrative purposes left out.

In an exemplary embodiment of the invention the service battery bank 200 comprises two serially connected service batteries 201 and 202. In said embodiment there is one battery equalizer output connector 235.

The battery charging and battery equalization system also comprises a starter battery bank 210 which comprise a first and a second, serially connected, starter battery 211 and 212. A negative pole of the first starter battery 211 is connected to a positive pole of the second starter battery 212, via a connection having a reference potential point 213. A negative pole of the second starter battery 212 is further connected to a grounded/earthed potential 214. In a further embodiment of the invention the starter battery bank 210 may comprise N serially connected batteries (not illustrated).

All batteries described and illustrated above may be of any type of 12V lead-acid, WET, MF, AGM batteries, but may also be, for the purpose suitable, GEL batteries. For illustrative purposes only lead-acid battery technology has been described in detail. Even though not explicitly described in this application, various embodiments of the invention are equally applicable to either of the Li-ion, NiMH, NiCd or NiZn technologies.

The buck-boost power converting circuit 232 described throughout present application is described in a general fashion comprising a single unit, but could be realized in many different ways; i.e. by a buck converter circuit coupled in parallel with a boost converter circuit.

The voltage source 221 produces a voltage of typically but not limited to 28.3V. The produced voltage is usable for charging the service battery bank 200 and the starter battery bank 210 described above. The produced voltage is lead to both the input connector 231 of the combined battery equalizer and battery charger 230 and also, in parallel, to the positive pole of the first service battery 201 of the service battery bank 200.

The voltage supplied to the positive pole of the first service battery 201 of the service battery bank 200 enables battery charging of the service battery bank 200. Vice versa, the voltage supplied to the combined battery equalizer and battery charger 230 enables controlled battery charging of the batteries 211 and 212 of the starter battery bank 210. By controlled battery charging of the batteries 211 and 212 of the starter battery bank 210 is meant that the combined battery equalizer and battery charger 230 is able to supply controlled charging currents to the batteries 211 and 212 of the starter battery bank 210. This is not described in any further detail in this application. The service battery bank 200 and the starter battery bank 210 may be charged simultaneously but are charged separately.

The service batteries 201 and 202 in the service battery bank 200 are charged directly by the voltage source 221. The combined battery equalizer and battery charger 230 operates either as a battery charger or a battery equalizer in two different modes; a battery charging mode or a battery equalization mode.

When the buck-boost power converting circuit 232 is operating in battery charging mode it produces and delivers, via output switch 233 through output connector 234 a voltage to the positive pole of the first battery 211 of the starter battery bank 210, thereby the starter battery bank 210 is being charged. Thus, in the battery charging mode, the buck boost converter 232 outputs a battery charging voltage, via the battery charging output switch 233, at output connector 234. The output connector 234 is connected to the positive pole of the first starter battery 211. Since the first starter battery 211 is serially connected to the second starter battery 212, charging of both the first and second serially connected batteries 211 and 212 is accomplished. The charging voltage is typically, but not restricted to, 26-32V. In some embodiments of this invention the charging voltage may be 24-28V.

Below, the battery equalization mode will now be described in more detail. In the battery equalization mode, the buck boost converting circuit 232 output a battery equalization voltage. The battery equalization voltage is determined by the number N of batteries connected in series in the service battery bank 200. Thus the battery equalization voltage equals the received voltage at input connector 231 divided by N. The buck boost converting circuit 232 is controlled by a processing logic circuit 236. The processing logic circuit 236 may for instance comprise a processor, microprocessor, an ASIC, FPGA, or the like. Processing logic circuit 236 may also process control data received from a memory, not illustrated. The memory may include a RAM, a ROM, and/or another type of memory to store data and instructions that may be used by processing logic circuit 236. In embodiments of present invention the processing logic circuit 236 comprise a control circuit 238 configured to control the operation of the buck boost converting circuit 232 and a switch control circuit 237 configured to control the battery charging output switch 233.

However, the control circuit 238 configured to control the operation of the buck boost converting circuit 232 and the switch control circuit 237 configured to control the battery charging output switch 233 may in a further embodiment of the invention be realized separately and/or independently and not in common processing logic circuit 236.

The voltage received by the input connector 231 of the combined battery equalizer and battery charger 230 is fed into the buck-boost power converting circuit 232. The buck-boost power converting circuit 232 is, in the battery equalization operating mode, configured to produce an equalization voltage required to maintain an equal potential over all N batteries to be charged. Thus, having N batteries coupled in series in the service battery bank 200, the equalization voltage provided from the buck-boost power converting circuit 232 to the respective voltage reference point 203, n is equal to the voltage received by the input connector 231 divided by N. Thereby ensuring stable and sufficient battery equalization/balancing of the batteries 201, 202 to $N_{th}$ of the service battery bank 200.

In an exemplary embodiment of the invention, comprising a service battery bank 200 with two serially coupled batteries 201 and 202, the equalization voltage provided from the buck-boost power converting circuit 232 is half the voltage received by the input connector 231. Thereby ensuring stable and sufficient battery equalization/balancing of the batteries 201 and 202 of the service battery bank 200. In said embodiment the equalization voltage is typically, but not restricted to, 13-16V. I.e. the equalization voltage is half of the supplied voltage received at input connector 231. In the exemplary embodiment, the power converting circuit 232, when operating in equalization mode, produces and delivers, via output switch 233 through battery equalizer output connectors 235 a voltage to midpoint connector 203 situated between the negative pole of the first service battery 201 and the positive pole of the second service battery 202 of the service battery bank 200. This will ensure that, even though the batteries are being charged, the potential over respective battery will be kept equal for both the first 201 and the second 202 service battery. And vice versa, in the same manner as above, during operation in battery equalization mode, the switch control circuit 237 makes it impossible to deliver a voltage to the charging voltage output connector 234 when operating in battery equalization mode.

The battery charging voltage and the battery equalization voltage are delivered mutually excluding. The output switch 233 which is controlled by a switch control circuit 237 is only connected to one output connector 234, 235 to $(N-1)_{th}$ at a time. This ensures interlocking of the battery equalizer output and the battery charging output.

Furthermore is included an service output connector 241 which enables service voltage to be outputted to various loads 242, such as typically lights, electronics equipments and other, typically operating at around 12VDC. The service output connector 241 will receive a voltage at the same potential as the battery equalization voltage. Thus, in short, the battery equalizer mode of an exemplary embodiment of the invention enables the power converting circuit 232 to convert the power of approximately 26-32V input to control an output to be half of the input. When the 12V load 242 is smaller than the capacity of the combined battery equalizer and battery charger 230 operating in battery equalization mode, in a state where the 24V service battery bank 200 is connected to the combined battery equalizer and battery charger 230, the voltage of the two service batteries 201 and 202 is sustained to be always the same. Hence is achieved a better balanced service battery bank 200.

The buck-boost converter circuit 232 is a type of DC-DC converter that has an output voltage magnitude which is either greater than, or less than, the input voltage magnitude. It is a switch mode power supply with a similar circuit topology to the boost converter and the buck converter. The output voltage is adjustable based on the duty cycle of a switching means, typically a transistor or the like.

Figure 3:
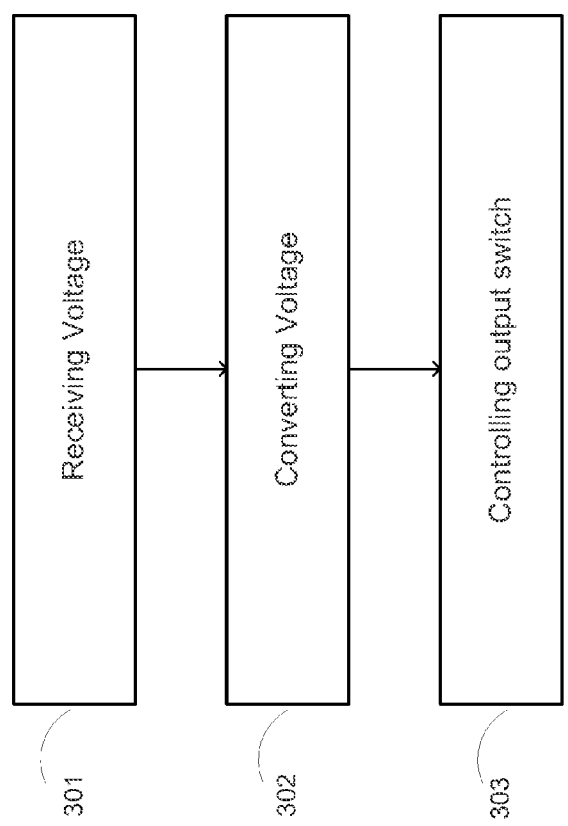
FIG. 3 is a flowchart of an execution of an exemplary embodiment of the invention.

FIG. 3 is a flow chart illustrating a method for combined battery charging and battery equalization in an exemplary embodiment of the in the combined battery charger and battery equalizer 230. The first step of the method comprises receiving 301 an electrical voltage from a voltage source 221. This is followed by converting 302 the received electrical voltage into, either a battery equalization voltage, or a battery charging voltage. This conversion is performed by the buck-boost converter circuit 232 as described above. The method further comprise controlling 303 an output switch 233 to output, either the battery equalization voltage, or the battery charging voltage to either a battery equalizer output connector 235 or to a battery charging output connector 234.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A combined battery charger and battery equalizer configured to equalize a service battery bank including at least two serially-connected batteries, and to charge a starter battery bank, the combined battery charger and battery equalizer comprising:
    a buck-boost power converting circuit configured to convert a received electrical voltage into either a battery equalization voltage or a battery charging voltage, the buck-boost power converting circuit being connected to an output switch configured to selectively output the battery equalization voltage to a battery equalizer output connector and the battery charging voltage to a battery charging output connector,
    wherein the battery equalizer output connector is configured to be connected to a voltage reference point provided between the two serially-connected batteries of the service battery bank.

2. The combined battery charger and battery equalizer according to claim 1, further comprising a processing logic circuit configured to control the buck-boost power converting circuit and the output switch.

3. The combined battery charger and battery equalizer according to claim 1, further comprising a switch control circuit configured to control the output switch to either output the battery equalization voltage to the battery equalizer output connector, or to output the battery charging voltage to the battery charging output connector.

4. The combined battery charger and battery equalizer according to claim 2, further comprising a switch control circuit configured to control the output switch to either output the battery equalization voltage to the battery equalizer output connector, or to output the battery charging voltage to the battery charging output connector.

5. The combined battery charger and battery equalizer according to claim 1, further comprising a control circuit configured to control the conversion of the received voltage in the buck boost converting circuit.

6. The combined battery charger and battery equalizer according to claim 2, further comprising a control circuit configured to control the conversion of the received voltage in the buck boost converting circuit.

7. The combined battery charger and battery equalizer according to claim 3, further comprising a control circuit configured to control the conversion of the received voltage in the buck boost converting circuit.

8. The combined battery charger and battery equalizer according to claim 4, further comprising a control circuit configured to control the conversion of the received voltage in the buck boost converting circuit.

9. The combined battery charger and battery equalizer according to claim 1, further comprising a service output connector configured to output a service voltage having the same voltage potential as the battery equalization voltage.

10. The combined battery charger and battery equalizer according to claim 2, further comprising a service output connector configured to output a service voltage having the same voltage potential as the battery equalization voltage.

11. The combined battery charger and battery equalizer according to claim 3, further comprising a service output connector configured to output a service voltage having the same voltage potential as the battery equalization voltage.

12. The combined battery charger and battery equalizer according to claim 4, further comprising a service output connector configured to output a service voltage having the same voltage potential as the battery equalization voltage.

13. The combined battery charger and battery equalizer according to claim 5, further comprising a service output connector configured to output a service voltage having the same voltage potential as the battery equalization voltage.

14. The combined battery charger and battery equalizer according to claim 6, further comprising a service output connector configured to output a service voltage having the same voltage potential as the battery equalization voltage.

15. The combined battery charger and battery equalizer according to claim 1, wherein the number of serially connected batteries in the service battery bank are two, and the buck-boost power converting circuit is configured to convert the received electrical voltage into a battery equalization voltage being half of the received electrical voltage.

16. The combined battery charger and battery equalizer according to claim 2, wherein the number of serially connected batteries in the service battery bank are two, and the buck-boost power converting circuit is configured to convert the received electrical voltage into a battery equalization voltage being half of the received electrical voltage.

17. The combined battery charger and battery equalizer according to claim 3, wherein the number of serially connected batteries in the service battery bank are two, and the buck-boost power converting circuit is configured to convert the received electrical voltage into a battery equalization voltage being half of the received electrical voltage.

18. The combined battery charger and battery equalizer according to claim 4, wherein the number of serially connected batteries in the service battery bank are two, and the buck-boost power converting circuit is configured to convert the received electrical voltage into a battery equalization voltage being half of the received electrical voltage.

19. The combined battery charger and battery equalizer according to claim 5, wherein the number of serially connected batteries in the service battery bank are two, and the buck-boost power converting circuit is configured to convert the received electrical voltage into a battery equalization voltage being half of the received electrical voltage.

20. The combined battery charger and battery equalizer according to claim 8, wherein the number of serially connected batteries in the service battery bank are two and the buck-boost power converting circuit is configured to convert the received electrical voltage into a battery equalization voltage being half of the received electrical voltage.

21. The combined battery charger and battery equalizer according to claim 9, wherein the number of serially connected batteries in the service battery bank are two, and the buck-boost power converting circuit is configured to convert the received electrical voltage into a battery equalization voltage being half of the received electrical voltage.

22. The combined battery charger and battery equalizer according to claim 14, wherein the number of serially connected batteries in the service battery bank are two, and the buck-boost power converting circuit is configured to convert the received electrical voltage into a battery equalization voltage being half of the received electrical voltage.

23. A combined battery charging and battery equalization system comprising:
a voltage source connected to a combined battery equalizer and battery charger configured to convert an electrical voltage received from the voltage source into either a battery equalization voltage or a battery charging voltage
wherein the combined battery equalizer and battery charger is selectively connected to a positive pole of a starter battery bank, enabling the combined battery equalizer and battery charger to provide a controlled battery charging of the starter battery bank and connected to a voltage reference point provided in between at least two batteries of a service battery bank enabling the combined battery equalizer and battery charger to provide a controlled battery equalization of the service battery bank by providing the battery equalization voltage to the voltage reference point.

24. The battery charging and battery equalization system according to claim 23, wherein the combined battery equalizer and battery charger is operatively connected to an electrical load.

25. The battery charging and battery equalization system according to claim 23, wherein the combined battery equalizer and battery charger further comprises:
a buck-boost power converting circuit configured to convert the received electrical voltage into either the battery equalization voltage or the battery charging voltage, the buck-boost power converting circuit being connected to an output switch configured to output either the battery equalization voltage to a battery equalizer output connector or the battery charging voltage to a battery charging output connector.

26. The battery charging and battery equalization system according to claim 24, wherein the combined battery equalizer and battery charger further comprises:

a buck-boost power converting circuit configured to convert the received electrical voltage into either the battery equalization voltage or the battery charging voltage, the buck-boost power converting circuit being connected to an output switch configured to output either the battery equalization voltage to a battery equalizer output connector or the battery charging voltage to a battery charging output connector.

27. The battery charging and battery equalization system according to claim 23, wherein the combined battery equalizer and battery charger further comprises a processing logic circuit configured to control the buck-boost power converting circuit and the output switch.

28. The battery charging and battery equalization system according to claim 24, wherein the combined battery equalizer and battery charger further comprises a processing logic circuit configured to control the buck-boost power converting circuit and the output switch.

29. The battery charging and battery equalization system according to claim 25, wherein the combined battery equalizer and battery charger further comprises a processing logic circuit configured to control the buck-boost power converting circuit and the output switch.

30. The battery charging and battery equalization system according to claim 26, wherein the combined battery equalizer and battery charger further comprises a processing logic circuit configured to control the buck-boost power converting circuit and the output switch.

31. A method for combined battery charging and battery equalization in a combined battery charger and battery equalizer, the method comprising:

receiving a voltage from a voltage source;

converting the received voltage into either a battery equalization voltage or a battery charging voltage; and controlling an output switch to selectively output the battery equalization voltage and the battery charging voltage to a battery equalizer output connector and to a battery charging output connector, respectively, wherein the battery equalization voltage is configured to be applied to a connectable voltage reference point of a connectable service battery bank including at least two batteries connected in series, the voltage reference point being provided in between the batteries of the service battery bank.

\* \* \* \* \*